US011133951B2

(12) United States Patent
Bruno et al.

(10) Patent No.: US 11,133,951 B2
(45) Date of Patent: Sep. 28, 2021

(54) AUTOMATION OF EXCHANGES BETWEEN COMMUNICATING OBJECTS

(71) Applicant: ORANGE, Issy-les-Moulineaux (FR)

(72) Inventors: Adrien Bruno, Chatillon (FR); Vincent Giraudon, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 128 days.

(21) Appl. No.: 16/471,350

(22) PCT Filed: Dec. 18, 2017

(86) PCT No.: PCT/FR2017/053663
§ 371 (c)(1),
(2) Date: Jun. 19, 2019

(87) PCT Pub. No.: WO2018/115690
PCT Pub. Date: Jun. 28, 2018

(65) Prior Publication Data
US 2020/0396099 A1    Dec. 17, 2020

(30) Foreign Application Priority Data

Dec. 20, 2016    (FR) ..................................... 1662825

(51) Int. Cl.
*G06F 15/177*    (2006.01)
*H04L 12/28*    (2006.01)
*H04L 29/08*    (2006.01)

(52) U.S. Cl.
CPC .......... *H04L 12/2807* (2013.01); *H04L 67/14* (2013.01)

(58) Field of Classification Search
CPC ........................... H04L 12/2807; H04L 67/14
See application file for complete search history.

(56) References Cited

U.S. PATENT DOCUMENTS

2012/0226366 A1    9/2012  Lee et al.
2013/0067065 A1    3/2013  Navasivasakthivelsamy et al.
2016/0150350 A1    5/2016  Ingale et al.
(Continued)

FOREIGN PATENT DOCUMENTS

EP    2887704 A1 *  6/2015   ............ H04L 67/24
EP    2887704 A1     6/2015
EP    2887704 B1 *  8/2020   ............ H04W 4/026

OTHER PUBLICATIONS

International Preliminary Report on Patentability and English translation of the Written Opinion dated Jun. 29, 2019 for corresponding International Application No. PCT/FR2017/053663, filed Dec. 18, 2017.
(Continued)

*Primary Examiner* — Richard G Keehn
(74) *Attorney, Agent, or Firm* — David D. Brush; Westman, Champlin & Koehler, P.A.

(57) ABSTRACT

A method is proposed for managing interactions via a communication network between a first object and a second object connected by a link, the link connecting at least one function of the first object to at least one function of the second object. The network includes an assembly of objects. The includes, in the first object: storing at least one execution agreement relating to a link between two objects of the network, activating at least one link connecting a function of the first object, the link being included in at least one execution agreement.

7 Claims, 5 Drawing Sheets

(56) References Cited

U.S. PATENT DOCUMENTS

2017/0279774 A1* 9/2017 Booz .................. H04L 67/34
2019/0268284 A1* 8/2019 Karame ............... H04L 9/3236

OTHER PUBLICATIONS

International Search Report dated Feb. 5, 2018 for corresponding International Application No. PCT/FR2017/053663, filed Dec. 18, 2017.
Written Opinion of the International Searching Authority dated Feb. 5, 2018 for corresponding International Application No. PCT/FR2017/053663, filed Dec. 18, 2017.

* cited by examiner

AUTOMATION OF EXCHANGES BETWEEN COMMUNICATING OBJECTS

CROSS-REFERENCE TO RELATED APPLICATIONS

This Application is a Section 371 National Stage Application of International Application No. PCT/FR2017/053663, filed Dec. 18, 2017, the content of which is incorporated herein by reference in its entirety, and published as WO 2018/115690 on Jun. 28, 2018, not in English.

FIELD OF THE INVENTION

The field of the invention is that of interactions between objects, in particular between communicating objects (also called connected objects) such as computers, tablets, smartphones, but also cameras of webcam type, weather stations, sensors, thermostats, etc.

The communication network used by these objects to interact with one another can be any network; for example, the latter can be an Internet network, a local area network, etc.

The communication technology used by these objects can be any technology; for example, the latter can be the Wifi, Bluetooth, ZigBee, Z-Wave, or other such technology.

In particular, the invention is applicable in the field of the remote control of connected objects, in the field of home automation, etc.

TECHNOLOGICAL BACKGROUND

The field of the Internet of the objects is that of exchanges of data between communicating objects. In particular, this field uses techniques allowing these communicating objects to interact remotely through a network of objects.

The management of the communicating objects is performed conventionally by trusted third parties: the referencing of these objects is performed in a centralized database, notably public, the exchange of data between these objects is performed through a platform of one or more service providers, the service billing process is performed also via one or more third parties, the storage of the traces of these exchanges is performed also in databases of centralized type, and so on.

Thus, the interactions between communicating objects are dependent on service platforms which centralize the requests sent and received by these objects, particularly when these interactions engender financial remunerations. Also, the users of these objects do not have solutions for controlling the use of the data exchanged by and through these objects.

The invention offers a solution that does not present the drawbacks of the state of the art.

SUMMARY

To this end, according to a first aspect, a method is proposed for managing interactions via a communication network between a first object and a second object that are linked by a link, the link connecting at least one function of the first object to at least one function of the second object, the network including a set of objects, the method comprising in the first object:

memorizing at least one execution agreement relating to a link between two objects of the network, activating at least one link connecting a function of the first object, said link being included in at least one execution agreement.

The method implements a management of the interactions between two communicating objects by virtue of an execution agreement stored in the network of objects, and in particular in the first object.

Thus, the method offers the advantage of allowing a link connecting functions of two objects of the network to be activated according to an execution agreement, without the intervention of a trusted third party.

A function of a communicating object corresponds either to a function of a real object (object, television, lamp, camera, etc.), or to a software function implemented by a communicating object.

The functions of an object are its capabilities, such as vision, image projection, the capacity to heat, the capacity to move, etc. For example, a television has the functions of receiving images and of displaying these images. A "PTZ" camera has the function of capturing images in any direction of sight, by virtue of the movements of the camera on two axes.

A link between two objects such as a smartphone and a camera can link these two objects by associating their respective functions that are the movement (one of the functions of the smartphone being to measure its position relative to a reference frame that is fixed in the space and for example supply two angles relative to a basic orientation, and one of the functions of the camera being to receive angular parameters and to orient itself in this same direction) and the processing of the images (other functions of the smartphone being to receive images and to project them onto a screen, and another function of the camera being to capture images). Thus, the two objects, through the complementarity of their functions, can be associated.

There is then obtained, when a movement of the smartphone is detected, the triggering of an equivalent movement of the camera, and, when the images are captured by the camera, the triggering of their projection on the screen of the smartphone.

The result of this association between two communicating objects, via their respective functions, is an automated link between these two communicating objects, called "entanglement". Two communicating objects thus associated are said to be "entangled".

Once the association is memorized between two functions of two objects, the triggering of the first function on the first object will trigger the execution of the second function on the second object. The link is then said to be "activated".

According to an implementation, an activation of a link connecting a function of the first object comprises an access to an execution agreement relating to the corresponding link and an execution of an execution agreement relating to the corresponding link.

This implementation allows for an automated management of the interactions between communicating objects. Automated management is understood to mean a control of the rules of interaction between two objects defined in computer programs that are the execution agreements. In effect, these agreements, also called contracts or smart contracts by the person skilled in the art, are computer programs which run autonomously. The modalities of performance of the interactions between objects are not controlled by a trusted third party but automatically through the very existence of this computer program in the network.

An execution agreement relating to a link connecting two functions of two objects can determine the triggering of the first function on the first object. In effect, the execution agreement can check the correct operation of all the components necessary to the activation of a link.

According to another implementation, which will be able to be implemented as an alternative to or together with the preceding one, an access to an execution agreement relating to a link connecting a function of the first object comprises a search through the network for the parts to said agreement not memorized in the first object, and memorizing said found parts in the first object.

This implementation allows any object of the network to access any execution agreement present in the network of objects in order, for example, for any object of the network to be able to check the existence, the content or the authenticity of an agreement. In effect, an agreement is incorporated in a decentralized computer storage system formed by objects which constitute a network of nodes, an object storing all or part of an execution agreement. An execution agreement is duplicated several times in the network. Any object of the network can interrogate one or other objects of the network to retrieve all or part of an execution agreement stored in the nodes of the network.

The emergence of new technologies for the storage and transmission of information of "decentralized" type through a computer network, is opening way to new prospects for autonomous execution of execution agreements relating to entanglements. These technologies, through their architecture, are powerful and give glimpses of new prospects for economic models. The Bitcoin model is an example of monetization of services through a so-called decentralized network: the "blockchain" technology is a secured technology operating with no central control member. Ultimately, blockchains could, for example, replace most of the centralizing trusted third parties of the distributed computer systems.

According to another implementation, which will be able to be implemented as an alternative to or together with the preceding ones, an execution of an execution agreement relating to a link connecting a function of the first object comprises access to traces of execution of the corresponding link, and a verification of the traces of execution of the corresponding link.

This implementation allows any object of the network to retrieve and memorize traces of execution of an automated link between two objects of the network of objects in order to check the modalities of performance of interactions between objects. The traces of execution are data stored in the nodes of the network. Network is understood to mean one or more networks through which will circulate the exchanged data necessary to the implementation of the method. The nodes of the network comprise communicating objects of the network, servers and computers of the network, etc.

According to another implementation, which will be able to be implemented as an alternative to or together with the preceding ones, an execution of an execution agreement relating to a link connecting a function of the first object comprises a search for a second link between the first object and a third object geographically close to the second object.

This implementation makes it possible to check whether, beyond a link between a first object and a second object which is on the point of being activated, a link between the first communicating object and a third communicating object geographically close to the second object would be more relevant.

A search for a second link can be performed in particular according to the list of entanglements governed by an execution agreement.

According to a variant of this implementation, a search for a second link between the first object and a third object geographically close to the second object comprises a search for a quality-of-service relevance result.

This variant makes it possible to base a search for a second link according to quality-of-service criteria, such as a search for a better user experience for a desired service.

An entanglement engine arranged in the network and provided with artificial intelligence can feed, over time, the database referencing the links between communicating objects. A new execution agreement can thus be proposed automatically: in a case where a user acquires a new touch tablet of tactile iPad type, this user will be able to be offered a new agreement relating to new entanglements.

A search for a second link may be performed for example because of a criterion of unavailability of the second communicating object.

According to another implementation, which will be able to be implemented as an alternative to or together with the preceding ones, an execution of an execution agreement relating to a link connecting a function of the first object comprises a distribution of the remunerations for third parties associated with the operation of said link.

This implementation makes it possible to automatically allocate remunerations to the third parties operating a link and the functions of the corresponding objects. In particular, when financial issues can be involved, the interactions between communicating objects are thus controlled by contractualized agreements between different third parties, for example between users of objects and suppliers of hardware and/or of services associated by link with these objects (manufacturers, operators, etc.).

The execution of an execution agreement checks the modalities of performance of an entanglement and allows for an automated distribution of the remunerations to third parties through the network, without the intervention of a trusted third party.

Since an execution agreement is accessible to any object of the network, any third party or party to a previously established agreement can justify its right to receive a remuneration relating to this agreement. Conversely, any third party not included in an agreement can justify its loss from traces of execution memorized in the network and accessible to any object of the network.

According to another implementation, which will be able to be implemented as an alternative to or together with the preceding ones, a memorization in the first object of an execution agreement relating to a link between two objects of the network also comprises a memorization of an execution agreement relating to a link between two objects of said set not connecting any of the functions of the first object.

This implementation makes it possible to distribute the load of storage of the execution agreements over all or some of the nodes of the network. Any object of the network has a shared database that it makes available to the data exchange protocol put in place within a decentralized network.

Likewise, the load of storage of the traces of execution is distributed over all or some of the nodes of the network.

According to a hardware aspect, the invention relates to a communicating object which manages interactions via a communication network with a second communicating object to which it is linked by a link connecting at least one of its functions to at least one function of the second object, the network including a set of objects, the object comprising a processor and a database making it possible to:

memorize at least one execution agreement relating to a link between two objects of the network, activate at least one link connecting a function of the first object, said link being included in at least one execution agreement.

Through the incorporation of the method of the invention in communicating objects, objects make it possible to put in place a mode of storage and transmission of execution agreement information within a network of decentralized type.

These objects constitute nodes of the network and have the hardware architecture of a conventional computer. Each comprises in particular a processor, a random-access memory of RAM type and a read-only memory in which is stored a computer program according to the invention.

According to a hardware aspect, the invention relates to a generation device which generates an execution agreement between two objects contained in a network of communicating objects, the device comprising a processor and a database making it possible to:

reference a link connecting at least one function of a first object to at least one function of a second object, establish an execution agreement relating to the corresponding link, broadcast said execution agreement to at least some of the communicating objects of the network.

A generation device makes it possible to reference links between communicating objects already present or integrating a network of objects, according to functions associated with the objects. In a particular implementation, an entanglement engine makes it possible to automate the detection of entanglements between communicating objects. This entanglement engine can be, for example, incorporated in a generation device.

A generation device establishes, from the referencing of the entanglements, execution agreements between third parties, in particular by directly or indirectly exchanging with them. A mediation platform can, via a human-machine interface, guide a user on the modalities to be defined for the establishment of an execution agreement.

In one embodiment, the database memorizing links between communicating objects of a network is incorporated in a generation device. In a variant, the database is distributed through a decentralized storage system formed by objects which constitute a network of nodes. This system is governed by proofs of non-falsification of data.

Once an agreement is established, the generation device broadcasts the execution agreement within the network of objects.

According to another hardware aspect, the invention relates also to databases storing execution agreements and traces of execution, these databases being incorporated in objects or networks of objects.

According to another hardware aspect, the invention relates also to a computer program implemented in communicating objects.

Such a program can use any programming language. It can be downloaded from a communication network and/or stored on a computer-readable medium.

The invention also targets a computer-readable storage medium on which is stored a computer program comprising program code instructions for the execution of the steps of the method for managing interactions according to the invention as described above. Such a storage medium can be any entity or device capable of storing the program. For example, the medium can comprise a storage means, such as a ROM, for example a CD ROM or a microelectronic circuit ROM, or else a magnetic storage means, for example a USB key or a hard disk.

Also, such a storage medium can be a transmissible medium such as an electrical or optical signal, which can be routed via an electrical or optical cable, wirelessly or by other means, such that the computer program that it contains can be executed remotely. The program according to the invention can in particular be downloaded over a network, for example the Internet network.

Alternatively, the storage medium can be an integrated circuit in which the program is incorporated, the circuit being adapted to execute or to be used in the execution of the abovementioned display control method.

Obviously, each of the equipment items (communicating object, generation device) comprises software means such as instructions of the abovementioned computer program, these instructions being executed by physical means such as at least one processor and a working memory.

BRIEF DESCRIPTION OF THE DRAWINGS

The invention will be better understood on reading the following description, given by way of example and with reference to the attached drawings in which.

DETAILED DESCRIPTION OF ILLUSTRATIVE EMBODIMENTS

In the following detailed description of embodiments of the invention, many specific details are presented to provide a more comprehensive understanding. Nevertheless, the person skilled in the art can realize that embodiments can be realized without these specific details. In other cases, features that are well known are not described in detail to avoid unnecessarily complicating the description.

Figure 1:
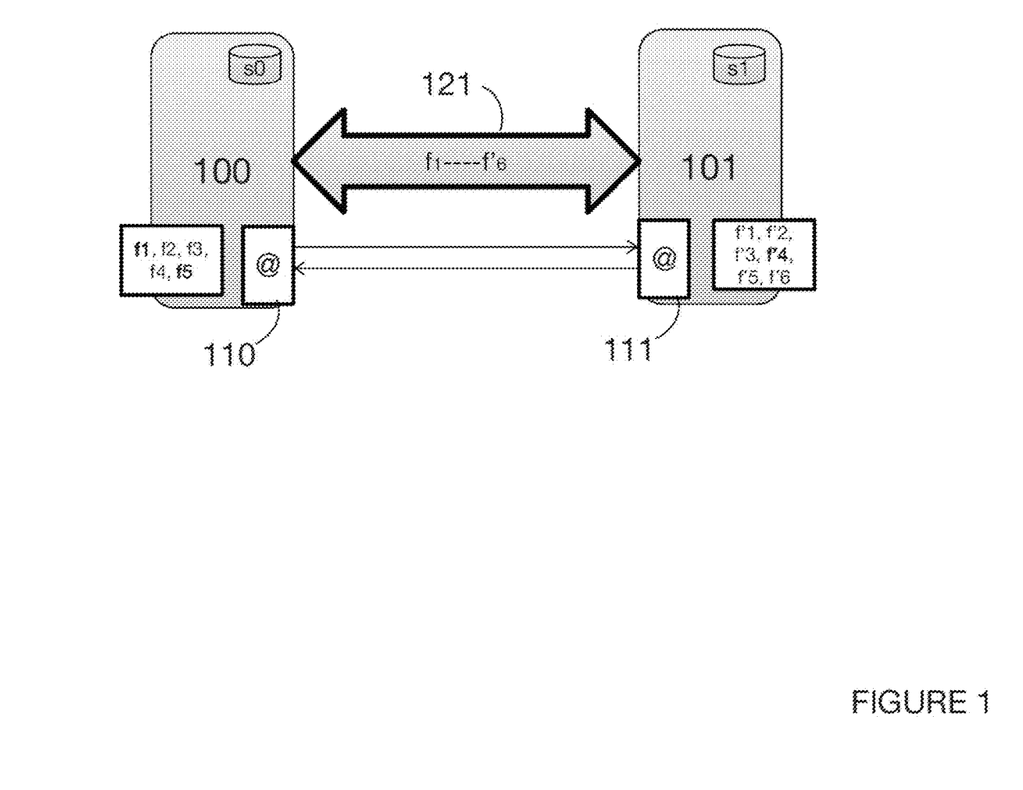
FIG. 1 illustrates two objects linked by a link connecting a function of the first object and a function of the second object.

FIG. 1 illustrates two communicating objects 100 and 101 respectively having an address, for example an IP address, identifying them within the network and respectively denoted 110 and 111.

The two objects have been previously registered with a common server, for example a web server or a data server in a "cloud" or a private network: an object transmits to the server its connection data and its identification which is independent of the connection data. Thus, by virtue of its connection data and of its identification, whatever the network or place where an object is located, this object will be able to be joined by another object of the network. The connection data can comprise, for example, an IP address and a TCP communication port.

The two objects and their associated functions (f1, f2, f3, f4 and f5 for the object 100, and the functions f'1, f'2, f'3, f'4, r5 and f'6 for the object 101) are referenced with a database, for example centralized by a trusted third party.

An entanglement (121) is also illustrated between the function f1 of the first object 100 and the function f'6 of the second object 101.

Local databases incorporated in the objects 100 and 101 objects are respectively denoted s0 and s1. These bases are used in particular for memorizing execution agreements proposed in the method of the invention.

Figure 2:
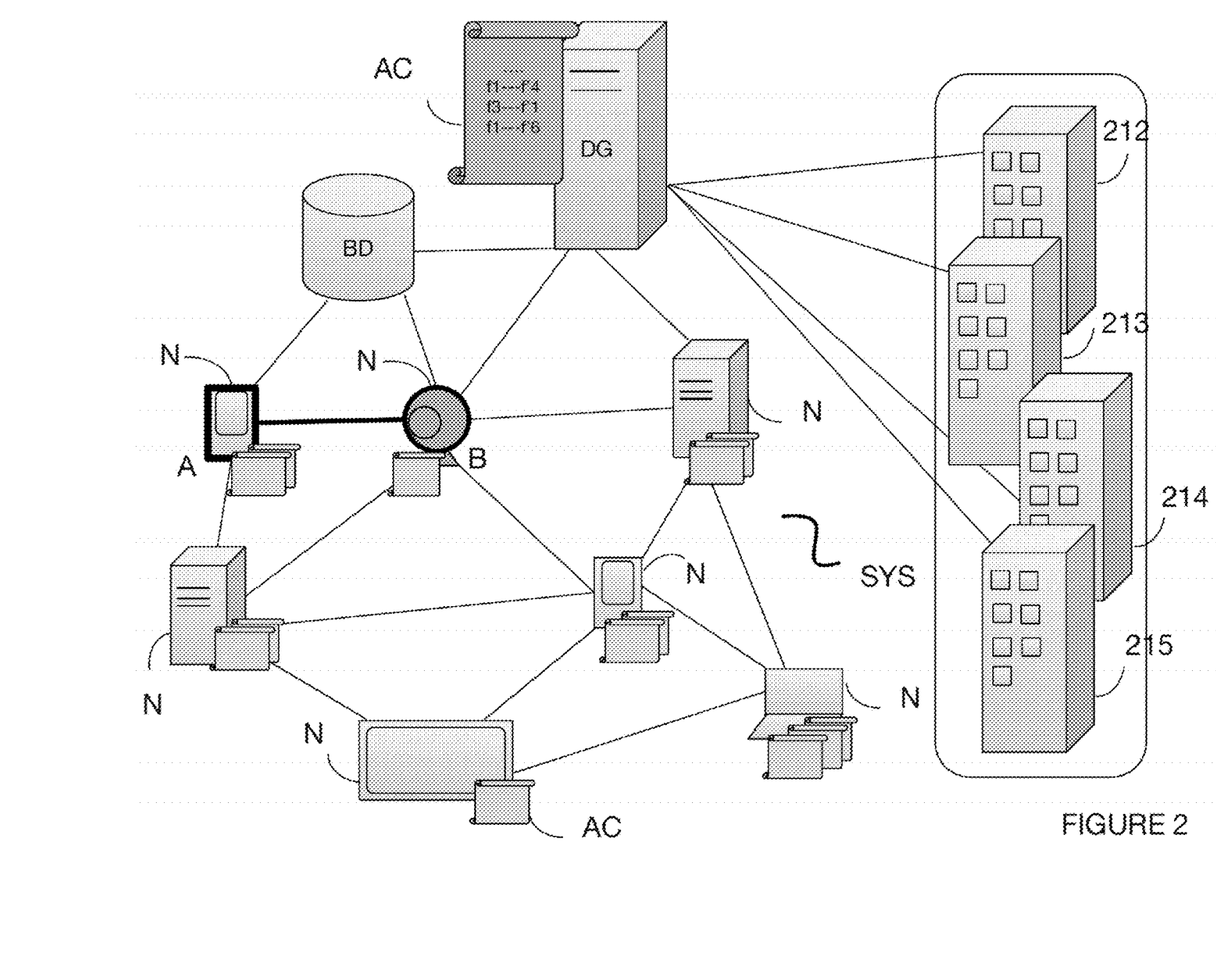
FIG. 2 illustrates a broadcast through a decentralized network of an execution agreement established between third parties involved in the operation of a link.

FIG. 2 illustrates a broadcast through a decentralized network of an execution agreement AC established between third parties involved in the operation of a link between two objects A and B.

The method describes an automated management of the interactions between two objects A and B through the use of an information storage and transmission technology (or mode) of decentralized type. "Decentralized" technology is understood to mean a technology based on the distribution of loads over resources available through a network: storage loads, computation capacity, sharing, information processing, etc. The resources denoted N are potentially computers, servers, smartphones or other connected objects (watches, etc.), respectively having a database shared by the network. Shared database is understood to mean a database allocated to the information circulating within a network using a storage and transmission technology of decentralized type, such as blockchains.

A computer system SYS of FIG. 2 comprises a generation device DG which interrogates a database BD storing the addresses of the communicating objects A and B present within the network and a list of their respective functions. This database BD can in particular be public. In one embodiment, the referencing of the entanglements is performed and memorized by the device DG. In a variant, the referencing of the entanglements is memorized according to a decentralized storage mode through the network, by using local databases of the communicating objects.

The generation device DG then establishes an execution agreement relating to one or more entanglements between two objects A and B and broadcasts it through the network, in particular to the objects A and B whose entanglements are involved in the execution agreement, in order for the latter to be stored by all or some of the objects of the network.

In this illustration, a smartphone A has features (screen, accelerometer, etc.) that make it possible to produce an entanglement with a camera B situated remotely, for example at the seaside, and belonging to a service provider 212 who leases the camera to make images available to the public.

The smartphone A and the camera B have published in the database BD the list of the sensors, actuators, mechanical functions, software functions that they are able to implement or execute, as well ancillary programs or services that they will need, for example, a network operator, a video codec, a digital-to-analog signal converter, etc. This list is of course not exhaustive, other programs or services can be offered.

When an activation of an entanglement is scheduled at a precise instant, on the day and at the time provided by the execution agreement, the smartphone A sends a notification of entanglement to the camera B. The screen of A retrieves the images captured by B which are conveyed via the telecommunication network of an operator 213, for a volume of data per image and by using a video compression system of a company 214.

The accelerometers of the smartphone A send to B movement information according to spatial coordinates which, by virtue of a conversion algorithm of a company 215, make it possible to drive stepper motors of the camera B and make it pivot in a desired direction.

When the user of the smartphone A is satisfied with the service and decides to hand over control, the execution agreement counts a number of images sent, for what network capacity, a number of movements which have been performed, etc. According to the terms of the agreement, it then calculates a remuneration to be granted to the third parties, for example for a network throughput used, a camera rental, a number of uses of the video compression system, a number of times that the conversion algorithm was called, a quantity of electricity which was used to power the camera for the duration of the entanglement, etc. In one embodiment, the execution agreement generates a notification of execution with the amount of each transaction, for example, from A to 212, to 213, to 214, to 215, etc., in a blockchain register. Other transactional movements can be performed (for example from B to 212). When the transactions are confirmed, that is to say when all, or at least several, copies of the register have been updated, the wallets (also called "E-wallets" by the person skilled in the art) of the third parties or parties involved in an entanglement, are updated.

An execution agreement between two objects can be based on several entanglements. For example, for two smartphones having the same functions, vision by camera and reception of the image on a screen, there will be at least two possible entanglements: vision/screen and screen/vision between the two smartphones. These two entanglements will be defined in the blockchain and it will be possible to switch from one of the entanglements to the other or even have them both operate at the same time.

In a variant that is not illustrated here, a so-called complex link is defined as a link involving several functions of at least one of the objects.

The execution agreements can launch an application in the blockchain. After the phase of establishment of an agreement by the generation device DG, the agreement will remain fixed throughout the life of the agreement. In our example, nothing can be deleted from the blockchain but an agreement can be rendered inoperative. In a variant however, the value of at least one variable will be able to be entered by a trusted third party. For example, if the execution of an agreement relies on the result of a sport match, the result of the match will be subsequently included in the blockchain in order for the agreement to be executed according to this value.

It goes without saying that the embodiment which has been described above has been given in a purely indicative and nonlimiting manner, and that many modifications can easily be made by the person skilled in the art without in any way departing from the scope of the invention.

Figure 3:
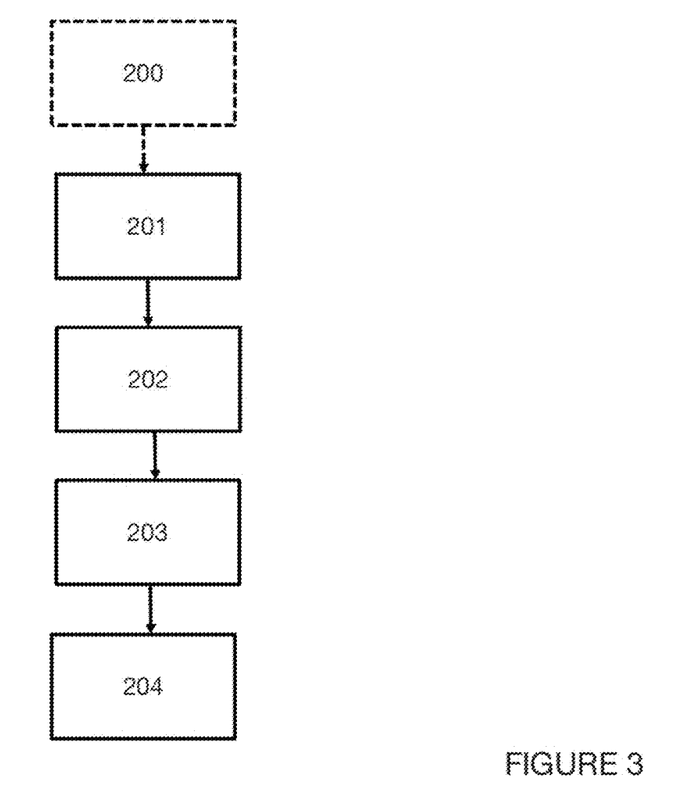
FIG. 3 illustrates the main steps performed in a network of objects for the implementation of the method of the invention.

FIG. 3 illustrates the main steps performed in a network of objects for the implementation of the method of the invention.

In the step 200, through a manual or automated referencing system, objects and their functions are referenced in one or more centralized or non-centralized databases.

This step of referencing of objects and of functions 200 precedes the step of referencing of entanglements 201. Several entanglements can be referenced between two objects. For example, four entanglements can be referenced between the following two pairings of objects, smartphone/loudspeaker and smartphone/camera. In effect, a smartphone has a screen, a loudspeaker, an audio receiver and a rotation sensor: four functions are therefore associated with the smartphone. Remotely, there is a loudspeaker which has a transceiver (2 associated functions) and a camera which records images and has a sensor (2 associated functions). There are therefore two possible entanglements between the smartphone and the loudspeaker, and two other entanglements between the smartphone and the camera.

In a second step 202, the establishment of an agreement is performed automatically or in an "assisted" manner. In effect, a platform of a third party service provider can be positioned as intermediary between a user of an object and a generation device DG of an execution agreement, for example via a web interface, in order to allow the user to configure the modalities of an agreement that he or she wants to establish with one or more suppliers of hardware and/or of services, in particular according to rules concerning his or her personal data contained or exchanged through his or her object. For example, the owner of a connected watch wants the activity data generated and stored by his or her object not to be transmitted to the partners of a the manufacturer of the watch, even if an application of a partner is natively incorporated in the watch. A user can establish an agreement in this sense.

In a particular embodiment, the configuration of an execution agreement relies on a database BD, on a generation device DG and on an entanglement engine, for example placed in the device DG and defined by an artificial intelligence that makes it possible to automate the detection of entanglements within the network of objects.

In a variant, the generation device broadcasts the agreement in a network of objects with additional data allowing the users of the objects to be guided via a human-machine interface specific to this agreement.

In a particular embodiment, the use of a decentralized technology, such as "blockchains" for example, makes it possible to fix, in specific data, also called registers, transmitted through a network, an execution agreement which governs the entanglement of two or more communicating objects. Once the agreement is created it will not be able to be modified except by destroying it. Blockchain is understood to mean a distributed database which manages a list of records protected against falsification or modification by the objects forming the network.

In a third step 203, an activation of a link is initiated for example by the sending of a notification, called notification of entanglement, from the first object to the second object, and allows exchanges of data between these objects to execute the functions relating to each object associated with this link. In effect, an activation of a link by the first object is performed either by the intervention of the user (scheduled or spontaneous) or by an automatic execution of the execution agreement.

In our example, at the same time, traces of execution of a link are memorized within the network. In a particular embodiment, the use of a decentralized data storage and transmission mode allows for a broadcasting of these traces (or proofs) of execution from the nodes forming the decentralized network; a node being able to be a communicating object. In the same way as an object of the network can store all or at least a part of one or more execution agreements, an object can store all or part of the traces of execution of a link. To access one or more parts of an execution agreement or traces of execution, an object can make the request for that to one or more objects of the network of objects. In a preferred embodiment, the execution agreements which include a link connecting a function of an object, are stored in their entirety in this object.

A check on the traces of execution of a link is performed upon the execution of an agreement. In one embodiment, a notification, called notification of execution, is sent by the first object and/or the second object relating to this link respectively to the second object and/or first object relating to this link.

In a fourth step 204, a distribution of the remunerations of the third parties is performed upon the execution of the agreement by updating the E-wallets of the third parties. E-wallets are understood to mean the virtual accounts of the third parties to which transfers of remunerations are performed.

Figure 4:
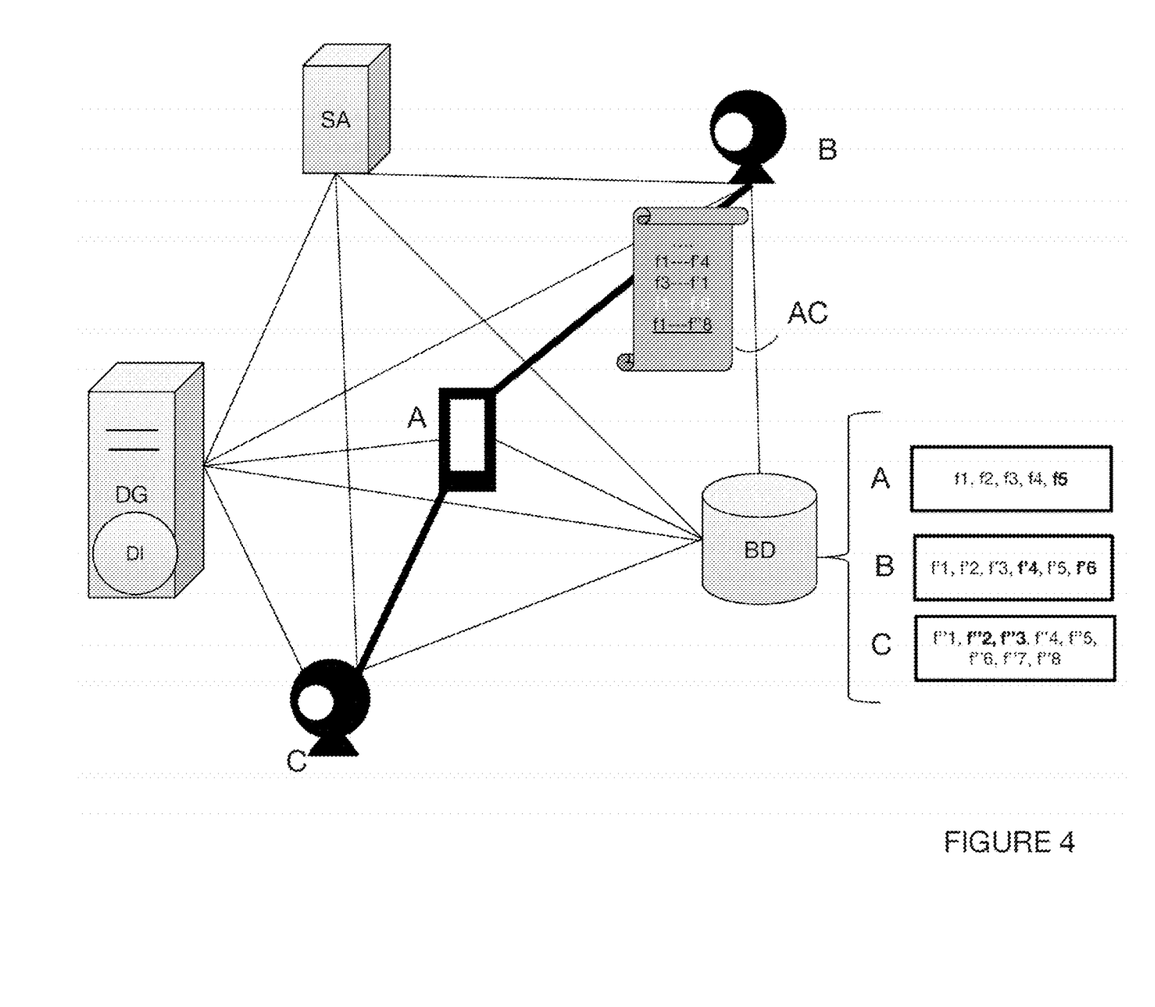
FIG. 4 illustrates a search for a second link using an entanglement engine.

FIG. 4 illustrates a search for a second link by an entanglement engine.

Through a web interface of a platform of a service provider SA, a user of a communicating object can connect to an online service to define the modalities of an execution agreement with one or more third parties.

A generation device DG establishes an agreement and broadcasts the latter within the network of decentralized type, and therefore in particular to the local databases of objects of the network.

In this embodiment, the establishment of execution agreements by the generation device DG is based on a platform SA, on a database BD and an entanglement engine DI making it possible to automate entanglements between objects. An entanglement engine identifies the possible entanglements in order to select compatible or ideal candidates dynamically (see below, an example of ideal entanglements). In this embodiment, the entanglement engine is located in the generation device DG. An entanglement engine can also codify the exchanges which will take place during an entanglement, find the partners and ancillary services that are needed by the exchanges, and configure the variables controlling these exchanges.

In the present text, an entanglement engine is a module which can be implemented in software form, in which case it takes the form of a program that can be executed by a processor, or in hardware form, such as an application-specific integrated circuit (ASIC), a system on chip (SOC), or in the form of a combination of hardware and software elements, such as, for example, a software program intended to be loaded and executed on a component of FPGA (Field-Programmable Gate Array) type.

A geolocation of the objects is defined in real time and allows for an ideal choice of entanglements and of objects best suited to the performance of a service for one or more users of objects. In effect, this geolocation is inscribed in the blockchain. An entanglement engine chooses between different objects, in particular included in an execution agreement and geolocated in proximity to one another to provide, for example, a better service (display of videos on a TV screen rather than a smartphone), in the case of unavailability of an object, etc. In FIG. 4, the link of the function f1 of the object A with the function f'6 of the object B, included in an agreement AC established between the objects A and B, cannot be activated because the function f'6 of the object B (in bold) is temporarily unavailable. The entanglement of the function f1 of the object A with the function f"6 of the object C, is then performed. An agreement can encompass several entanglements, in particular of different objects. In an agreement, the choice to use the most powerful object available for a desired function will be able to be specified. Within an agreement, it may be possible to change entanglements. An agreement can include several objects as several possible entanglements. The agreement provides a list of possible object/entanglement pairings.

Figure 5:
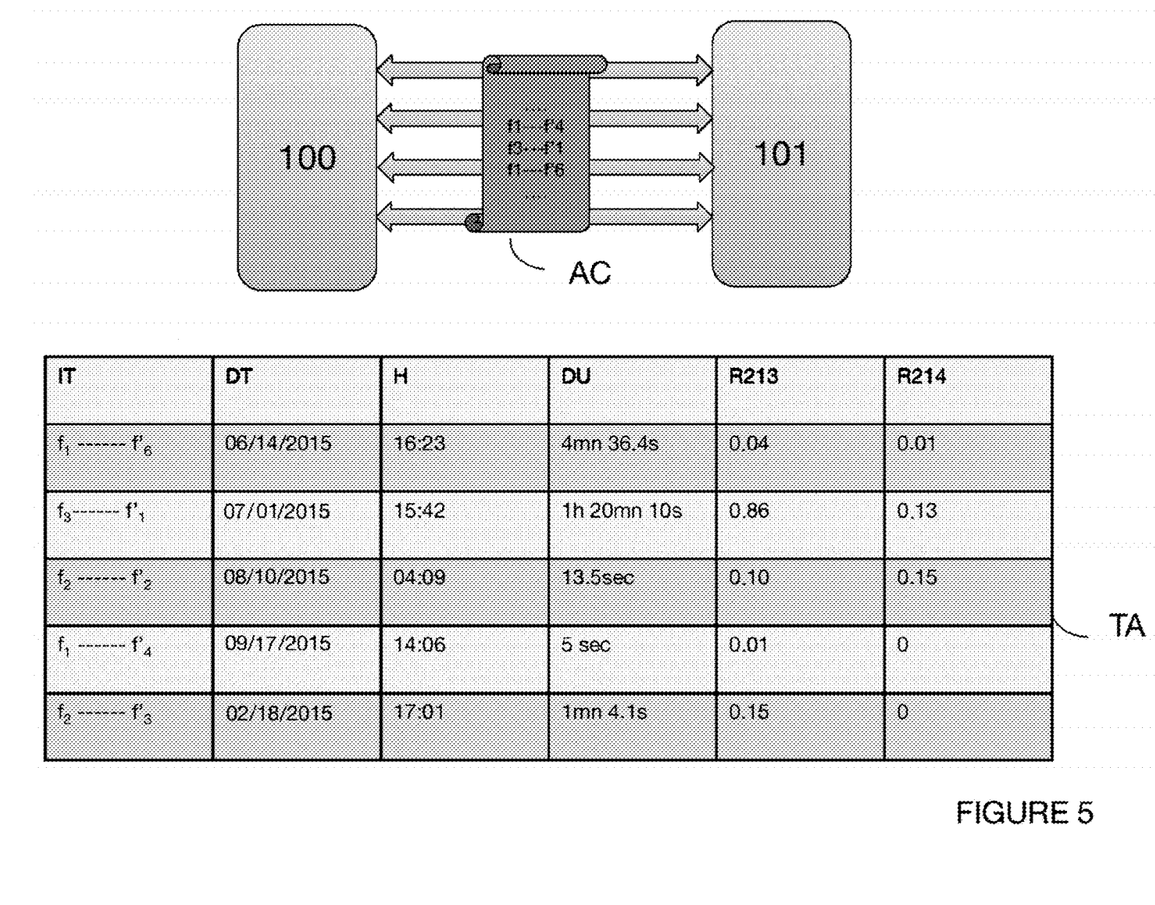
FIG. 5 illustrates a distribution of the remunerations between third parties involved in the operation of links as a function of the duration of use thereof.

FIG. 5 illustrates a distribution of the remunerations between third parties involved in the operation of links as a function of the duration of use thereof. In the table TA, the first column IT indicates entanglements included in an agreement AC established between the first object 100 and the second object 101, the second column DT indicates a date of activation of a link, the third column H indicates a link activation start time, the fourth column DU indicates a duration of activation of a link, the fifth and sixth columns R213 and R214 indicate the remunerations calculated for each of the third parties involved in the operation of a link according to a duration of use of the link. For example, for the entanglement connecting the function f2 of the first object with the function f'2 of the second object performed, for example on Aug. 10, 2015 for 13.5 seconds, the amount of the remuneration paid to the company 213 is 0.10€, and 0.15€ to the company 214.

This example of implementation makes it possible to remunerate the third parties as a function of a duration of use of the link without the intervention of a third party. The remuneration of the third parties can also be affiliated with counting parameters (number of images, bandwidth capacity, etc.) other than the time of use, or for example a count by deed. For a given link, each third party can define the mode of remuneration that it wants.

Depending on the embodiment selected, certain deeds, actions, events or functions of each of the methods described in the present document can be performed or occur in a different order from that in which they have been described, or can be added, merged or even not be performed or not occur, depending on the case. Furthermore, in some embodiments, some deeds, actions or events are performed or occur concurrently and not in succession.

Although described through a certain number of detailed exemplary embodiments, the method proposed and the object for the implementation of the method comprise different variants, modifications and refinements which will become evident to the person skilled in the art, it being understood that these different variants, modifications and refinements form part of the scope of the invention, as defined by the following claims. Furthermore, different aspects and features described above can be implemented together, or separately, or else substituted for one another, and all of the different combinations and sub-combinations of the aspects and features form part of the scope of the invention. Furthermore, it may be that certain systems and objects described above do not incorporate all of the modules and functions described for the preferred embodiments.

The invention claimed is:

1. A method for managing interactions via a communication network between a first communicating object and a second communicating object that can be linked by a link connecting at least one function of the first communicating object to at least one function of the second communicating object, the network including a set of communicating objects, the method comprising the following acts performed by the first communicating object:
    memorizing at least one execution agreement relating to a link between two communicating objects of the network, each of the at least one execution agreement being a computer program, and
    activating the link connecting a function of the first communicating object to a function of the second communicating object, said link being included in at least one execution agreement, each of the first and second communicating objects comprising at least one hardware element, the activating comprising:
        accessing an execution agreement relating to said link connecting the function of the first communicating object to the function of the second communicating object, the accessing comprising searching, in the other communicating objects of the network, for parts to said agreement not memorized in the first communicating object, and memorizing in the first communicating object the parts found in at least one other communicating object of the network,
        executing said execution agreement relating to the link connecting the function of the first communicating object, comprising searching for a second link between the first communicating object and a third communicating object geographically close to the second communicating object.

2. The management method as claimed in claim 1, wherein executing the execution agreement relating to said link connecting at least one function of the first communicating object to at least one function of the second communicating object, comprises:
    accessing traces of execution of said link,
    checking traces of execution of said link.

3. The management method as claimed in claim 1, wherein searching for a second link between the first object and a third object geographically close to the second object comprises searching for a quality-of-service relevance result.

4. The management method as claimed in claim 1, wherein executing the execution agreement relating to the link connecting the function of the first object comprises distributing remunerations for third parties associated with the operation of said link.

5. The management method as claimed in claim 1, wherein memorizing in the first object the execution agreement relating to the link between two communicating objects of the network also comprises memorizing an execution agreement relating to a link between two objects of said set not connecting any of the functions of the first object.

6. A first communicating object capable of managing interactions via a communication network with a second communicating object to which the first communicating object can be linked by a link connecting at least one of the first communicating object's functions to at least one function of the second communicating object, the network including a set of communicating objects, the first communicating object comprising:
    a processor, which has at least one hardware element, and a database configured to:
    memorize at least one execution agreement relating to a link between two communicating objects of the network, each of the at least one execution agreement being a computer program,
    activate the link connecting a function of the first communicating object to a function of the second communicating object, said link being included in at least one execution agreement, each of the first and second communicating objects comprising at least one hardware element, the activating comprising:
        accessing an execution agreement relating to said link connecting the function of the first communicating object to the function of the second communicating object, the accessing comprising searching, in the other communicating objects of the network, for parts to said agreement not memorized in the first communicating object, and memorizing in the first communicating object the parts found in at least one other communicating object of the network,
        executing said execution agreement relating to the link connecting the function of the first communicating object, comprising searching for a second link between the first communicating object and a third communicating object geographically close to the second communicating object.

7. A non-transitory computer-readable storage medium on which is stored a computer program comprising program code instructions for executing a method of managing interactions via a communication network between a first communicating object and a second communicating object that can be linked by a link, when the instructions are executed by a processor of the first communicating object, the link connecting at least one function of the first communicating object to at least one function of the second communicating object, the network including a set of communicating objects, and wherein the instructions configure the first communicating object to:
  memorize at least one execution agreement relating to a link between two communicating objects of the network, each of the at least one execution agreement being a computer program, and
  activate the link connecting a function of the first communicating object to a function of the second communicating object, said link being included in at least one execution agreement, each of the first and second communicating objects comprising at least one hardware element, the activating comprising:
  accessing an execution agreement relating to said link connecting the function of the first communicating object to the function of the second communicating object, the accessing comprising searching, in the other communicating objects of the network, for parts to said agreement not memorized in the first communicating object, and memorizing in the first communicating object the parts found in at least one other communicating object of the network,
  executing said execution agreement relating to the link connecting the function of the first communicating object, comprising searching for a second link between the first communicating object and a third communicating object geographically close to the second communicating object.

* * * * *